US000001098H

United States Statutory Invention Registration [19]

[11] Reg. Number: H1098

Hallum

[43] Published: Sep. 1, 1992

[54] INTEGRATED VALVE ASSEMBLY

[76] Inventor: Charles E. Hallum, 11 Foxglove Way, Irvine, Calif. 92715

[21] Appl. No.: 657,801

[22] Filed: Feb. 20, 1991

[51] Int. Cl.[5] ..... B64G 1/26

[52] U.S. Cl. ..... 60/229; 251/282; 244/169; 244/3.22

[58] Field of Search ..... 60/229, 233, 242; 244/3.22, 169, 229; 251/282, 356

[56] References Cited

U.S. PATENT DOCUMENTS

| | | | |
|---|---|---|---|
| 2,087,037 | 7/1937 | McCarthy | 251/282 |
| 4,473,091 | 9/1984 | Stoves | 251/282 |
| 4,477,056 | 10/1984 | Alexius | 251/282 |
| 4,500,070 | 2/1985 | Riollet et al. | 251/282 |
| 4,550,888 | 11/1985 | Douglass et al. | 244/3.22 |
| 4,955,558 | 9/1990 | Machell et al. | 244/3.22 |
| 4,986,512 | 1/1991 | Tiefenthaler | 251/282 |

FOREIGN PATENT DOCUMENTS

| | | | |
|---|---|---|---|
| 245713 | 8/1960 | Australia | 251/282 |
| 760055 | 10/1956 | United Kingdom | 251/282 |

*Primary Examiner*—Michael J. Carone

[57] ABSTRACT

An improvement to an integrated valve assembly which generally consists of a cluster of two poppet valves, four electric-solenoid-operated flapper valves, and four thrust nozzles and interconnecting plumbing. The improvement to the integrated valve assembly reduces the force required to operate the flapper valves thereby minimizing solenoid size, weight, and power consumption. The improvement consists of a modified flapper valve tip having a hole bored through the tip in the direction of tip motion, and a free-fitting piston located therein and suitably axially restrained relative to the flapper valve body.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$P_1$ = INLET PRESSURE
$P_2$ = UNDER PISTON PRESSURE
$P_3$ = POPPET FACE PRESSURE
$P_4$ = BLAST TUBE PRESSURE
$P_5$ = ACTUATOR PRESSURE $A_1$ = LINER-SEAT FLOW AREA
$A_2$ = POPPET-SEAT FLOW AREA
$A_{2S}$ = POPPET SEATING AREA
$A_3$ = VALVE THROAT AREA
$A_4$ = NOZZLE THROAT AREA
$A_5$ = PISTON AREA $D_2$ = POPPET DIA
$D_3$ = VALVE THROAT DIA
$D_4$ = NOZZLE THROAT DIA
$D_5$ = PISTON DIA

INTEGRATED VALVE ASSEMBLY

FIELD OF THE INVENTION

The present invention relates to valves and more particularly, but without limitation thereto, to an improvement to flapper valves within an integrated valve assembly which controls high pressure hot gas emanating from solid propellant gas generators and directed to thrust nozzles on a spacecraft.

DESCRIPTION OF THE PRIOR ART

Clusters of valves with attached nozzles (each such cluster defined as an integrated valve assembly, hereinafter IVA) are often deployed around the periphery of a spacecraft to provide a means for maneuvering, i.e., a means for making changes in position and velocity with respect to all six degrees of freedom. An example of such a deployment of IVAs is illustrated in FIG. 1 of U.S. Pat. No. 4,550,888, which describes the operation of such a system and is hereby incorporated by reference. Requirements for higher performance from solid-propellant-powered spacecraft maneuvering systems make it necessary that such valving systems be operated for many cycles over extended periods of time while subjected to hot gas containing particles of combustion detrimental to valve materials.

SUMMARY OF THE INVENTION

The instant valve flapper force balance device (hereinafter VFFBD) provides an improvement to IVA performance by enabling existing electrically-operated flapper valves to operate at higher pressures and/or longer periods of time without incurring the weight penalty associated with increased electrical power consumption.

The maximum battery power that is available to operate solenoids of flapper valves is limited by the payload weight capacity of the boost rocket vehicle; therefore the size of valve solenoids is limited. As gas flow rates increase, the limit size solenoids of existing flapper valves may no longer be effective. By adding a free piston to the flapper tip (the VFFBD of the present invention) the limited size solenoid is made to remain effective, as the force required to control a flapper valve having the VFFBD is less than the force required to control a flapper valve without the device. In this way, high flow rates can be controlled for an extended duration without exhausting the limited battery power available.

The objects, features, and advantages of the invention will become evident to those skilled in the art from the detailed description given hereinafter with reference to the figures of the accompanying drawings which illustrate a preferred embodiment by way of non-limiting example.

Figure 1:
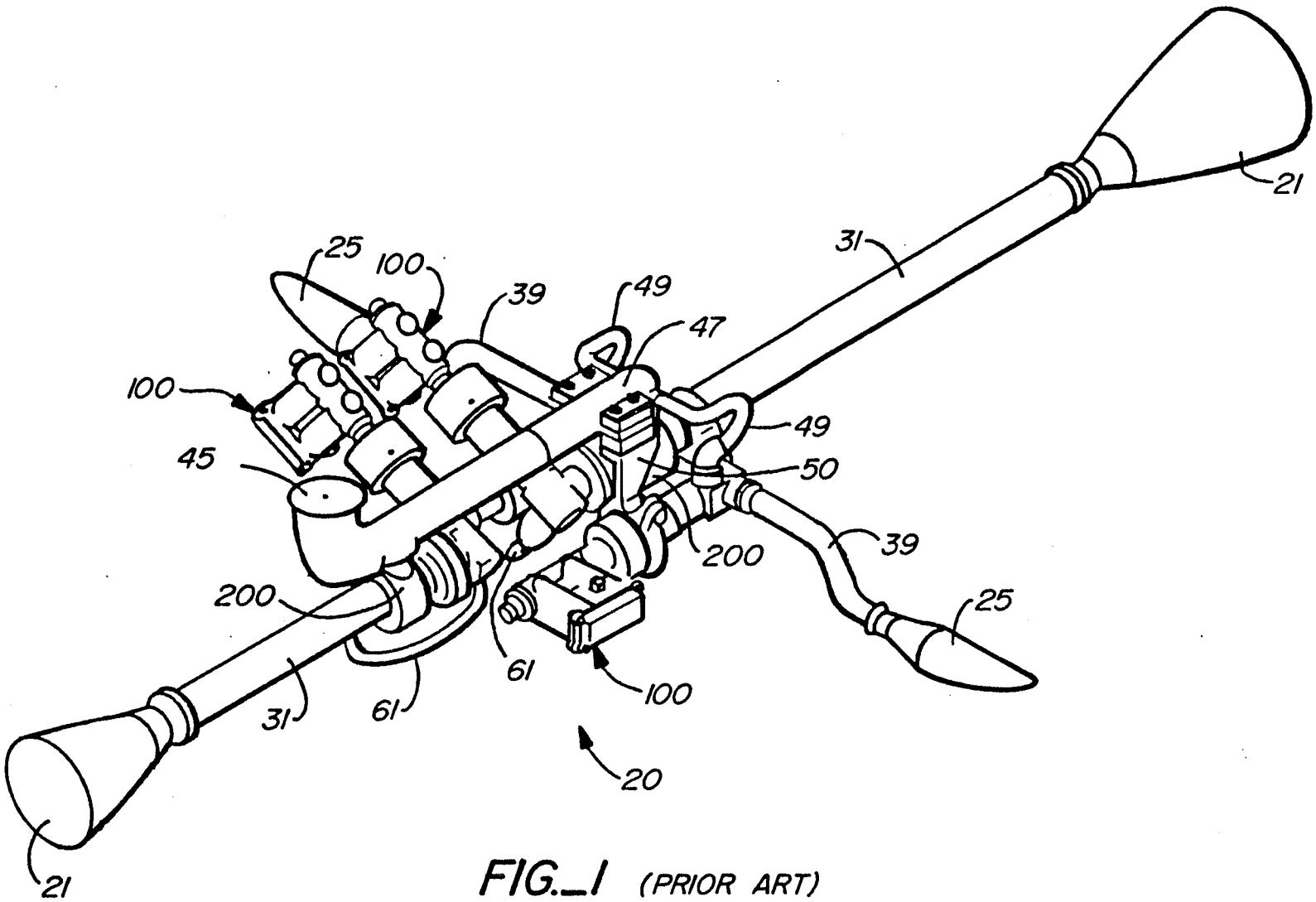
FIG. 1 (PRIOR ART)
FIG. 1 is a pictorial view of an integrated valve assembly.

Drawing Reference Numerals and Materials of Construction

| Number | Element Name/Material (if applicable) |
|---|---|
| 20 | Integrated Valve Assembly |
| 21 | Major Nozzle/Columbium Alloy C-103 [1] |
| 25 | Minor Nozzle/Columbium Alloy C-103 [1] |
| 31 | Major Blast Tube/Columbium Alloy C-103 [1] |
| 39 | Minor Blast Tube/Columbium Alloy C-103 [1] |
| 45 | Inlet Port |
| 47 | Manifold/Columbium Alloy C-103 [1] |
| 49 | Supply Tube/Columbium Alloy C-103 [1] |
| 50 | Support Bracket/Titanium Alloy 6-4 [6] |
| 61 | Vent Tube/Columbium Alloy C-103 [1] |
| 100 | Flapper Valve |
| 110 | Balance Piston/TZM [2] |
| 111 | Balance Piston Grooves |
| 112 | Spider/TZM [2] |
| 113 | Bottom Stop/Columbium Alloy C-103 [1] |
| 114 | Flexure Rod/TZM [2] |
| 115 | Bottom Cap/TZM [2] |
| 116 | Flex-Piston Assembly/TZM [2] |
| 123 | Body Assembly |
| 125 | Flapper Assembly |
| 127 | Solenoid Assembly |
| 129 | Flapper Valve Body/Columbium Alloy C-103 [1] |
| 131 | Inlet Boss |
| 132 | Cavity |
| 133 | Outlet Boss |
| 135 | Coupling Nut/Titanium Alloy 6-2-4-2 [7] |
| 137 | Coupling Split Washer/Titanium Alloy 6-4 [6] |
| 138 | Coupling Insulator Ring/3D Quartz [3] |
| 139 | Coupling Insulator Sleeve/3D Quartz [3] |
| 141 | Flapper Shroud/TZM [2] |
| 143 | Flapper Insulator Sleeve/3D Quartz [3] |
| 151 | Clevis/Cobalt-based Superalloy [4] |
| 153 | Pivot Pin/TZM [2] |
| 155 | Clevis Split Washer/Titanium Alloy 6-4 [6] |
| 157 | Armature Bolt/Stainless Steel Alloy for 1200° F., per MS 20033 |
| 161 | Locking Wire/Ni—Cr—Fe per MS 20995 N20 |
| 163 | Bushing/TZM [2] |
| 165 | Flapper/Columbium Alloy C-103 [1] |
| 167 | Bellows Assembly/Columbium Alloy C-103 [1] |
| 169 | Flapper Tip/TZM [2] |
| 170 | Hole in Flapper Tip |
| 171 | Flapper Tip Pin/TZM [2] |
| 173 | Armature/Magnetic Alloy [8] |
| 175 | Solenoid Assembly Cover/Alumina-Silica Composite [5] |
| 177 | Solenoid Housing/Titanium Alloy 6-4 [6] |
| 178 | Insulation Cover Cap/Alumina-Silica Composite [5] |
| 180 | Spring/17-7PH Stainless Steel |
| 181 | End Cap/Type 304 Stainless Steel |
| 182 | Solenoid Coil/HML Insulation over Copper Wire |
| 183 | Bus Bar/Magnetic Alloy [8] |
| 184 | Solenoid Screw/Cadmium plated Alloy Steel per NAS 1352C |
| 185 | Solenoid Cap/Aluminum Alloy 356-T6 |
| 186 | Solenoid Shim/Cartridge Brass per QQ-B-613 |
| 187 | Solenoid Coil Housing/Aluminum Alloy 356-T6 |

-continued

| Number | Element Name/Material (if applicable) |
|---|---|
| 188 | Pole Pieces/Magnetic Alloy [8] |
| 191 | Flapper Valve Orifice Seat/TZM [2] |
| 193 | Outlet Adjusting Shim/Columbium Alloy C-103 [1] |
| 195 | Outlet Ring/Columbium Alloy C-103 [1] |
| 200 | Poppet Valve |
| 202 | Body Bowl/Columbium Alloy C-103 [1] |
| 204 | Poppet Valve Seat/Tungsten, 2% Thorated |
| 206 | Liner/TZM [2] |
| 208 | Liner Retaining Ring/TZM [2] |
| 210 | Top Plate/TZM [2] |
| 212 | Cap/Columbium Alloy C-103 [1] |
| 214 | Piston/TZM [2] |
| 216 | Piston Front Land |
| 218 | Piston Back Land |
| 220 | Liner Port |
| 222 | Liner Axial Slot |

[1] C-103: 10% Hafnium, 1% Titanium, remainder Columbium
[2] TZM: 0.5% Titanium, 0.1% Zirconium, remainder Molybdenum
[3] 3D Quartz: Three-dimensionally woven Quartz/Silica Composite Insulation Material
[4] Cobalt-based Superalloy: 0.10% C, 1.5% Mo, 19.5% Cr, 10% Ni, 15% W, 3% Fe, 1% Si, remainder Cobalt
[5] Molded Alumina-Silica Composite Insulation Material
[6] Ti 6-4: 6% Aluminum, 4% Vanadium, remainder Titanium
[7] Ti 6-2-4-2: 6% Al, 2% Sn, 4% V, 2% Mo, remainder Titanium
[8] Magnetic Material: 49% Cobalt, 49% Iron, 2% Vanadium

DESCRIPTION OF THE PREFERRED EMBODIMENT

Referring now to the drawings wherein like reference numerals are used to designate like or corresponding parts throughout the various figures thereof, there is shown in FIG. 1 a pictorial view, and shown in FIG. 2 a corresponding schematic diagram, of an example version of an integrated valve assembly 20 (hereinafter IVA) which is the prior-art apparatus that is improved by the present invention, the present invention consisting of a valve flapper force balance device (hereinafter VFFBD).

Integrated Valve Assembly Construction

Figure 2:
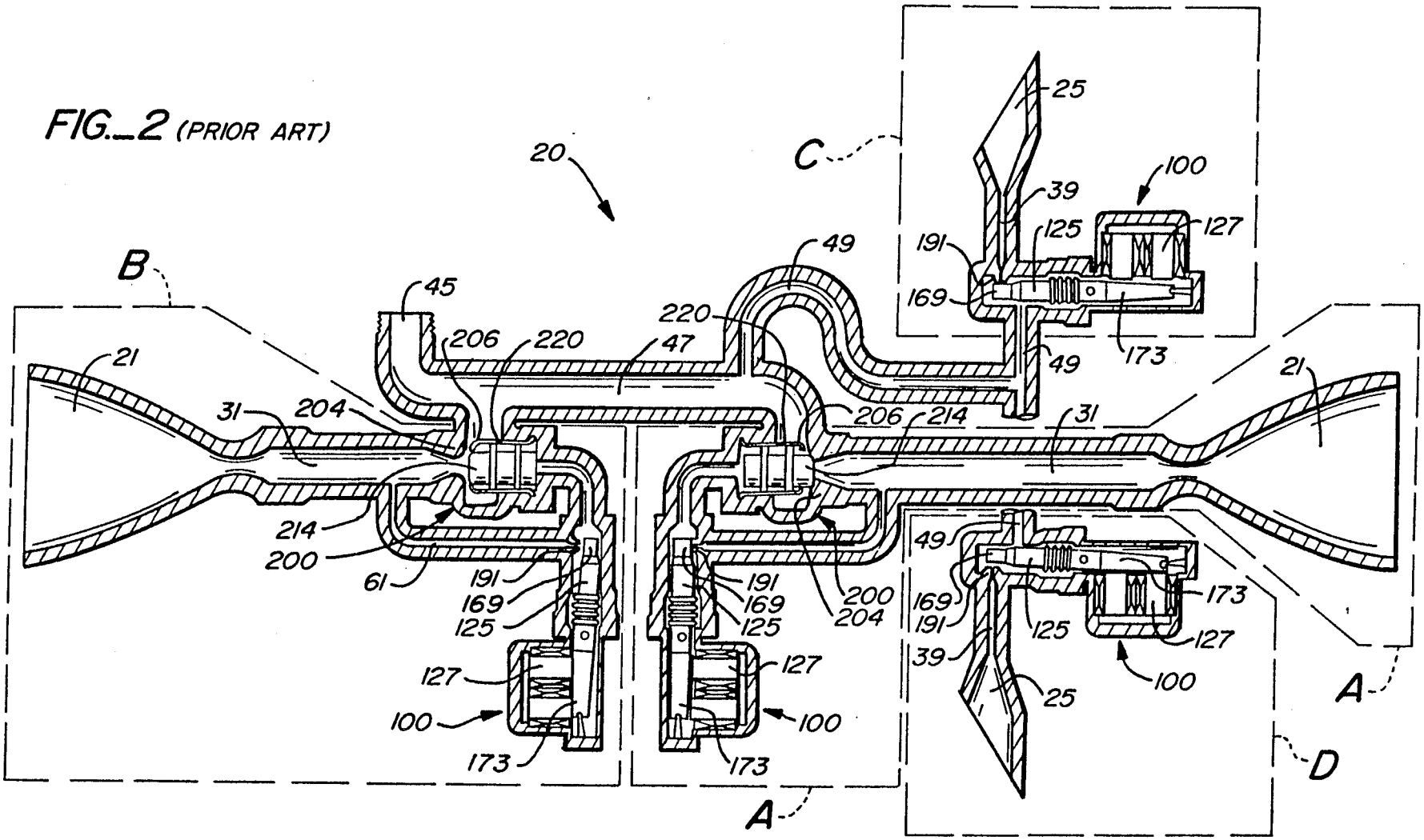
FIG. 2 (PRIOR ART)
FIG. 2 is a schematic side elevation view of an integrated valve assembly.

As shown in FIG. 2 by dashed enveloping lines, IVA 20 includes two high-thrust sections labeled A and B which each contain identical groups of elements; IVA 20 also includes two low-thrust sections labeled C and D which each contain identical groups of elements. The groups in the four sections are all tied together to form one integrated valve assembly 20 by interconnecting plumbing consisting of manifold 47 which directly connects between poppet valves 200 of each high-thrust section A and B, and by supply tube 49 which connects between manifold 47 and flapper valves 100 of each low-thrust section C and D. Additional structural connections are made via two support brackets 50 which each support a flapper valve 100 from manifold 47, as shown in FIG. 1. Associated with each high-thrust section (A or B) are poppet valve 200 and flapper valve 100, vent tube 61, major blast tube 31, and high-thrust major nozzle 21. Associated with each low-thrust section (C or D) are flapper valve 100, minor blast tube 39, and low-thrust minor nozzle 25. From the foregoing it can be seen that the integrated valve assembly 20 is essentially a single package consisting of six valves (two poppet valves 200 and four flapper valves 100) and four nozzles (two each of 21 and 25). Gas enters a single common inlet port 45; the valves (100 and 200) control from which nozzles the gas exits. The example integrated valve assembly 20 illustrated is of an all-welded metal construction and designed to operate at steady state 3000° F. gas temperature. When installed on a spacecraft the IVA 20 wrapped in a high-temperature thermal insulating quilt (from which the flapper valve solenoid assemblies 127 protrude out) to protect the solenoid assemblies 127 and other nearby spacecraft-mounted equipment from excessive heat. IVA 20 materials of construction are set forth in the list of drawing reference numerals. Details of the flapper valve 100 and the poppet valve 200 construction are set forth in following paragraphs.

The Flapper Valve Construction

Figure 3:
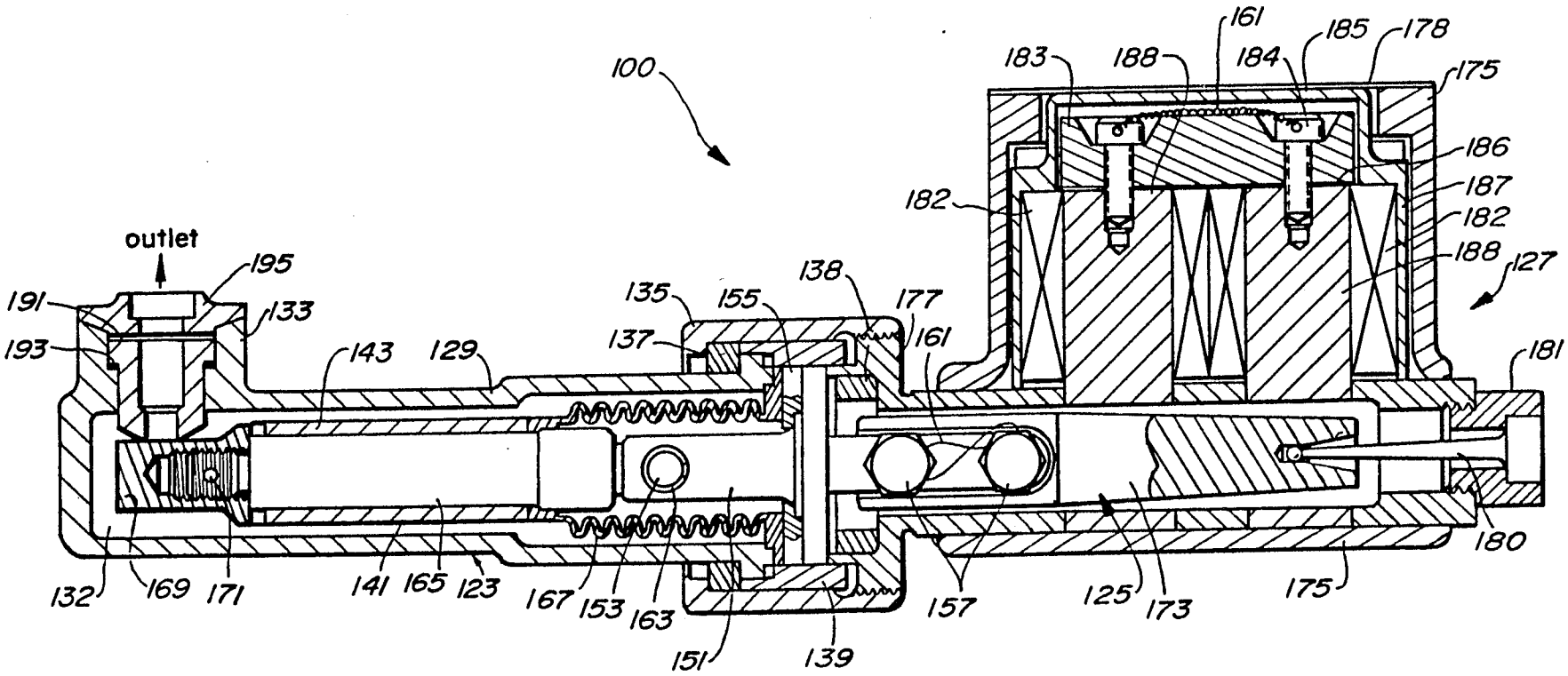
FIG. 3 (PRIOR ART)
FIG. 3 is a side elevation sectional view of a flapper valve, also designated (when used with a poppet valve) as a first-stage or pilot valve.
Figure 4:
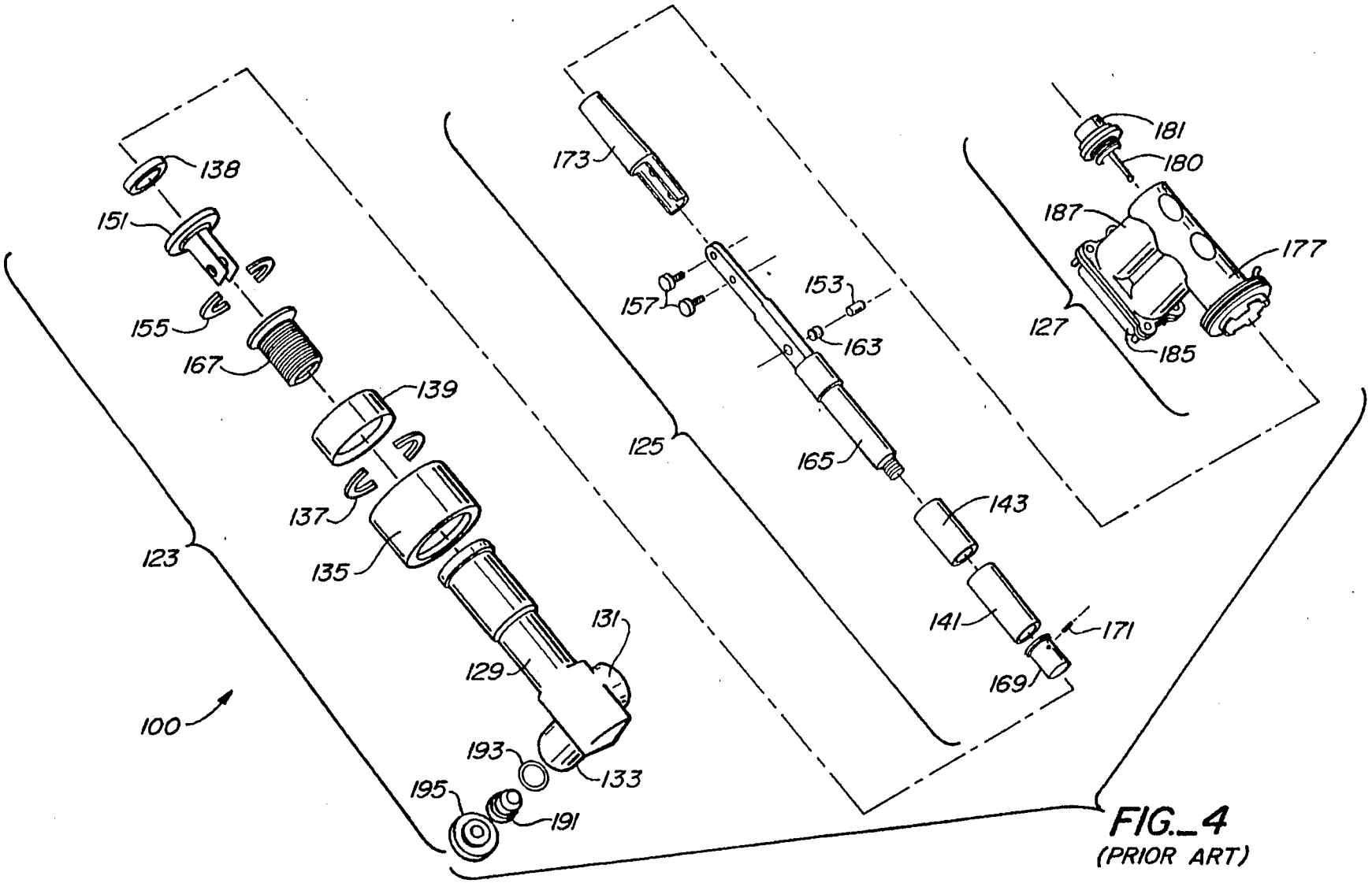
FIG. 4 (PRIOR ART)
FIG. 4 is an exploded view of a flapper valve illustrating the three major sub-assemblies.

FIG. 3 is a side elevation sectional view of an example version of a solenoid operated flapper valve 100, also shown in an exploded pictorial view in FIG. 4. The main sub-assemblies of flapper valve 100 are body assembly 123, flapper assembly 125, and solenoid assembly 127. Referring to both FIGS. 3 and 4, body assembly 123 includes body 129 having internal cavity 132 and inlet and outlet bosses 131 and 133 respectively, outlet adjusting shim 193, orifice seat 191, outlet ring 195, coupling nut 135, coupling split washer 137, coupling insulator sleeve 139, welded bellows assembly 167, clevis split washer 155, clevis 151, and coupling insulator ring 138. Flapper assembly 125 includes flapper tip 169, flapper tip pin 171, flapper shroud 141, flapper insulator sleeve 143, flapper 165, bushing 163, pivot pin 153, two each armature bolts 157 and locking wire 161, and tapered armature 173. Solenoid assembly 127 includes solenoid housing 177, two each pole pieces 188, two each solenoid coils 182 (wound in series and potted with an epoxy molding compound to provide mechanical protection), solenoid shim 186, bus bar 183, two each solenoid screws 184 and locking wire 161, solenoid coil housing 187, solenoid cap 185, solenoid assembly cover 175 (omitted in FIG. 4), insulation cover cap 178, end cap 181, and spring 180.

In operation the flapper assembly 125 pivots about pin 153. Hot gas in cavity 132 is isolated from the solenoid assembly 127 by welded bellows assembly 167 which flexes and hence allows for movement of flapper assembly 125. When solenoid coils 182 are energized armature 173 is attracted, which pivots the flapper assembly 125 about pin 153 causing flapper tip 169 to be removed from the face of orifice seat 191 thereby allowing hot gas to flow from the inlet 131 through cavity 132 and out the outlet 133. Armature 173 is tapered to have contact with pole pieces 188 when attracted. When power is removed from coils 182, flapper assembly 125 is then pivoted backwards by tapered spring 180 to close flapper tip 169 against the face of seat 191. Gas pressure in cavity 132 also tends to force flapper tip 169 against seat 191. The example of flapper valve 100 illustrated is designed to operate at temperatures of about 3,000° F. and over a period of 900 seconds which may involve a total number of on-off duty cycles of from about 500 to 4000 of variable time durations depending upon the maneuvers of the spacecraft. Flapper valve 100 materials of construction are set forth in the list of drawing reference numerals.

The Poppet Valve Construction

Figure 5:
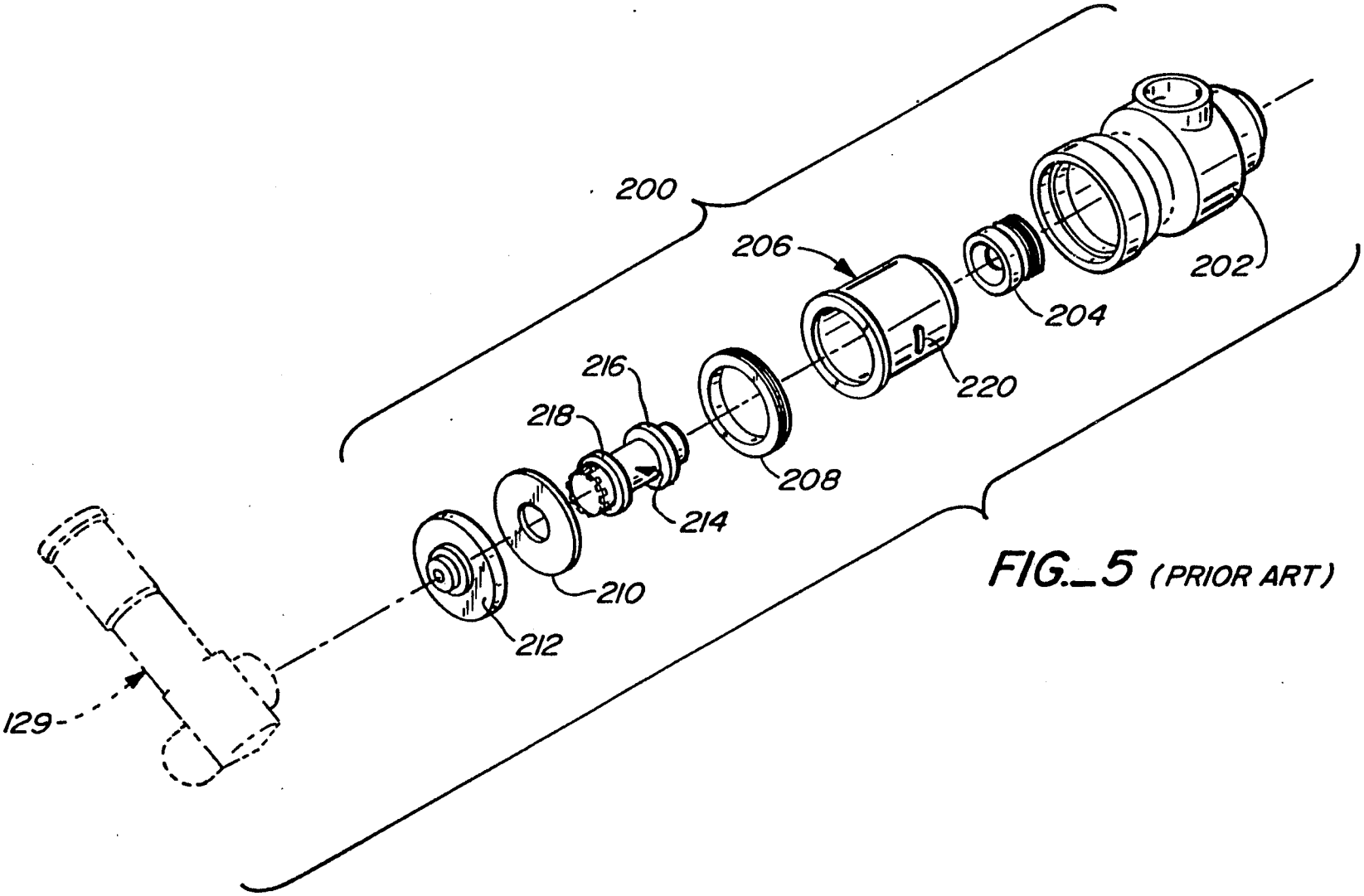
FIG. 5 (PRIOR ART)
FIG. 5 is an exploded view of a poppet valve (i.e., second-stage valve), with the mating body portion of a flapper (i.e., pilot) valve shown alongside in phantom.
Figure 6:
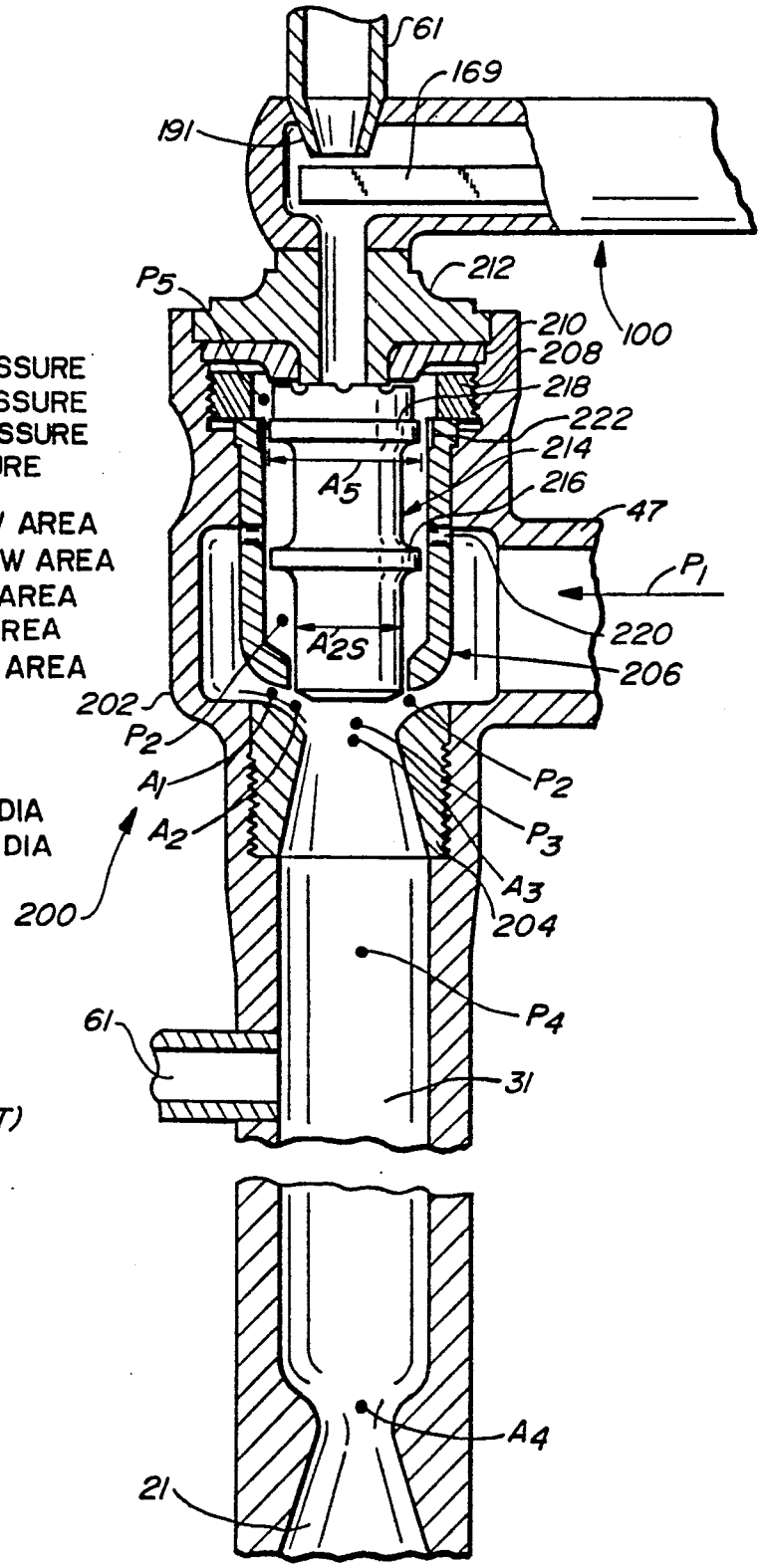
FIG. 6 (PRIOR ART)
FIG. 6 is a schematic side elevation view of a second-stage poppet valve, designating pressure and dimensional properties, and showing a portion of the body of an associated flapper pilot valve directly overhead.

The example version of poppet valve 200 illustrated in FIGS. 5 and 6 includes body bowl 202, poppet valve seat 204, linear 206 having ports 220 and axial slots 222, liner retaining ring 208, top plate 210, cap 212, and piston 214 having front land 216 and back land 218. The piston 214 slides within the liner 206; both are carburized to prevent galling. In the opening transient mode gas flow through the flapper pilot valve 100 is limited by the diametral clearance between back piston land 218 and liner 206 and by the dimensions of the liner 206 axial slots 222. In the example poppet valve 200 the diametral clearance between the two piston lands 216 and 218 and the liner 206 is about 0.003 to 0.0035 inches. Poppet valve 200 materials of construction are set forth in the list of drawing reference numerals.

Design & Operation of the Integrated Valve Assembly

In FIG. 2 sections labeled C and D each schematically illustrate a low-thrust valve and nozzle configuration, each section including a normally-closed single-stage solenoid-controlled flapper valve 100 which directly controls flow out of a minor nozzle 25. As shown in section C, with no electrical power applied to solenoid 127, the flipper tip 169 prevents flow from feed tube 49 into blast tube 39 by blocking orifice 191. With electrical power applied to solenoid 127 as shown in section D, flapper tip 169 uncovers orifice 191 and flow is allowed from feed tube 49 through orifice 191 and blast tube 39 and out nozzle 27.

In FIG. 2 sections labeled A and B each schematically illustrate a high-thrust valve and nozzle configuration, each section including a normally-closed single-stage solenoid-controlled flapper valve 100 functioning as a first-stage pilot valve to control a second stage poppet valve 200; the poppet valve 200 then in turn controls flow out of major nozzle 21. The poppet valve 200 controls the gas flow by means of a liner 206 and free piston 214 (within the liner) that is controlled by pilot valve 100. Gas flow to the pilot valve 100 is bled through the liner ports 220 past the piston back land 218 to the region behind the piston 214.

With no power to the pilot valve solenoid 127, as shown in section A, gas under pressure from manifold 47 is trapped behind the piston 214. Under these conditions the pressure differential across the free piston 214 causes it to remain forward (in the closed position) against poppet valve seat 204 preventing the gas from entering blast tube 31. When power is applied to the pivot valve solenoid 127, as shown in section B, gas behind the piston 214 escapes through vent tube 61 to blast tube 31, and the changed pressure differential across the free piston 214 now causes it to move backwards to the open position and to remain open until such time as the pilot valve 100 is closed.

Consider an example poppet valve 200 (of the configuration illustrated in FIGS. 2, 5, & 6) having an effective flow area $A_e$ of 0.18 in$^2$. As is evident from FIG. 6, several flow areas will contribute to the controlling flow area. The areas which primarily control the net flow are $A_1$, $A_2$, $A_3$ and $A_4$, which are (respectively) the liner-to-seat, piston-to-seat, valve throat, and nozzle throat areas. If the flapper pilot valve 100 gas flow via vent tube 61 adds about 6% to the total gas flow, then the liner-to-seat, poppet-to-seat, and valve throat areas must be decreased by that amount to compensate.

The relationship between $Y=A_e/A_4=P_4/P_1$ (the ratio of pressures in blast tube 31 to that in inlet manifold 47) and $X=A_1/A_3$ (the ratio of liner-to-seat area to valve throat area) is given by the following equation which approximates, over the range $0.7<X<1.0$, experimental data obtained from testing dimensionally similar valves.

$$Y=0.928-0.128/(X-0.368);\ \text{for } 0.7<X<1.0$$

A value of $Y=0.65$ (pressure ratio) has been selected, for example, in order to have adequate opening and closing forces acting on the valve piston 214. The corresponding value of X (area ratio) is 0.83 (obtained from the above equation).

The flow area relationships are:

$A_1=A_2$; (an example design choice)

$A_4=A_e/Y=0.18/0.28$ in$^2$ $A_3=0.94\ A_4$; (6% of flow bypassed away from $A_1$, $A_2$, & $A_3$)

$A_3=0.94\ (0.28)=0.26$ in$^2$ $D_n^2=(4/3.1416)(1/C_d)(A_n)$ $D_3^2=(1.273)(1/0.97)(0.26)$: (using a value of 0.97 for $C_d$)

$D_3=0.58$ in $D_4^2(1.273)(1/0.97)(0.28)$ $D_4=0.61$ in $D_2=1.3\ D_3$; (for dimensional similarity with valves tested)

$D_2=1.3(0.58)=0.74$ in $A_{2s}=(3.1416/4)(D_2)^2=0.43$ in$^2$; (piston seating area)

$A_1=A_2=0.83\ A_3$; (from $X=A_1/A_3=0.83$ for $Y=0.65$)

$A_1=A_2=0.83(0.26)=0.22$ in$^2$

Piston stroke S, and liner clearance C, are established by $A_1$ and $A_2$ ($A_1=A_2=0.22$ in$^2$), as follows:

$S=A_2/[(3.1416)(D_2)(\cos 20°)]$ $S=0.22/[(3.1416)(0.74)(0.97)]=0.10$ in $C=S(D_2/D_{liner})$ $C=0.10\ (0.74/0.96)=0.008$ in Consider, for example, a requirement for a 33 pound net begin-opening force ($F_{b.o.}$) acting on piston 214 at a manifold pressure $P_1$ of 100 psi, for a piston having a land diameter $D_5$ of 1.25 inches (hence a corresponding area $A_5$ of 1.23 in$^2$). The net begin-opening force ($F_{b.o.}$) acting on piston 214 is given by:

$$F_{b.o.}=(P_1-P_5)A_5-P_1(A_{2s})$$

$$F_{b.o.}=P_1(A_5-A_{2s})-P_5\ (A_5)$$

where pressures and areas are defined in FIG. 6.

The maximum value of actuator pressure $P_5$ can hence be computed:

$$P_5=P_1(A_5-A_{2s})/(A_5)-F_{b.o.}/A_5$$

$$P_5=100(1.23-0.43)/1.23-33/1.23=38\ \text{psi, and}$$

$$P_1/P_5=100/38=2.63$$

$A_{o.e.}$, the minimum required pilot flapper valve orifice effective area, can now be computed:

$A_{p.l.e.}$=piston/liner clearance effective area, $f\{P_5/P_1\}$=subsonic flow correction factor, and $P_1(A_{p.l.e.})(f\{P_5/P_1\})=P_5(A_{o.e.})$ $A_{o.e.}=(P_1/P_5)(A_{p.l.e.})(f\{P_5/P_1\})$ For completeness, the net begin-closing force ($F_{b.c.}$) acting on piston 214 is given by:

$$F_{b.c.}=(P_1-P_2)A_5+(P_2-P_3)A_{2s},$$

where $P_1$ is the pressure above the piston ($P_1=P_5$ with pilot closed), $P_2$ the pressure under the piston land 216, $P_3$ the average pressure under the piston poppet area, $A_5$ the maximum piston area (at lands), and $A_{2s}$ the poppet (piston seating) area.

For the example illustrated a pilot flapper valve with an effective area of 0.03 $in^2$ was selected to meet the requirements of a reasonable poppet valve size, due to the essentially inverse relationship (evidenced by the forgoing equations) between pilot valve orifice size and poppet valve size (e.g., piston land diameter $D_5$). Hence it is seen that the flapper valve orifice size is an important factor in the design of the total integrated valve assembly, from which it follows that the present invention (the VFFBD, which reduces the power requirements of flapper valves) is likewise an important contribution.

The Valve Flapper Force Balancing Device (VFFBD)

Figure 7:
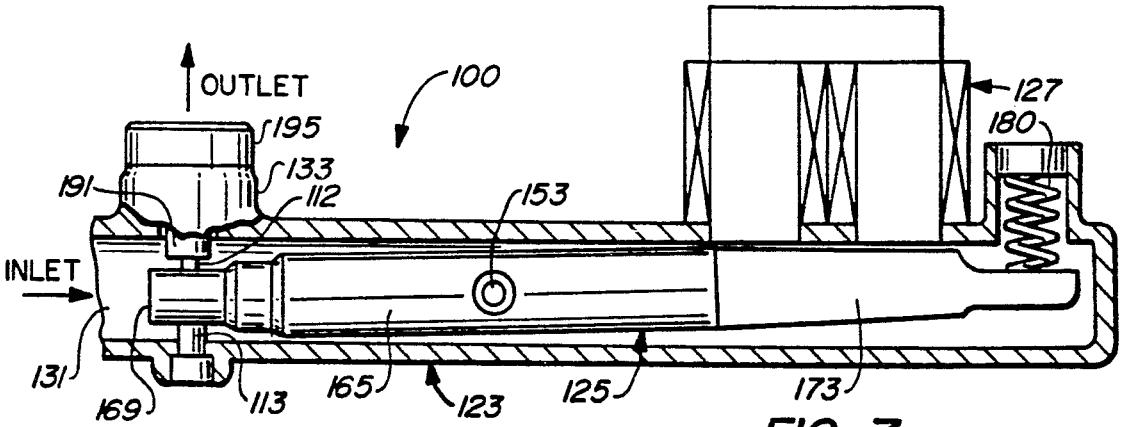
FIG. 7 is a side elevation sectional view of a flapper valve which incorporates the valve flapper force balance device (VFFBD) of the present invention.
Figure 8:
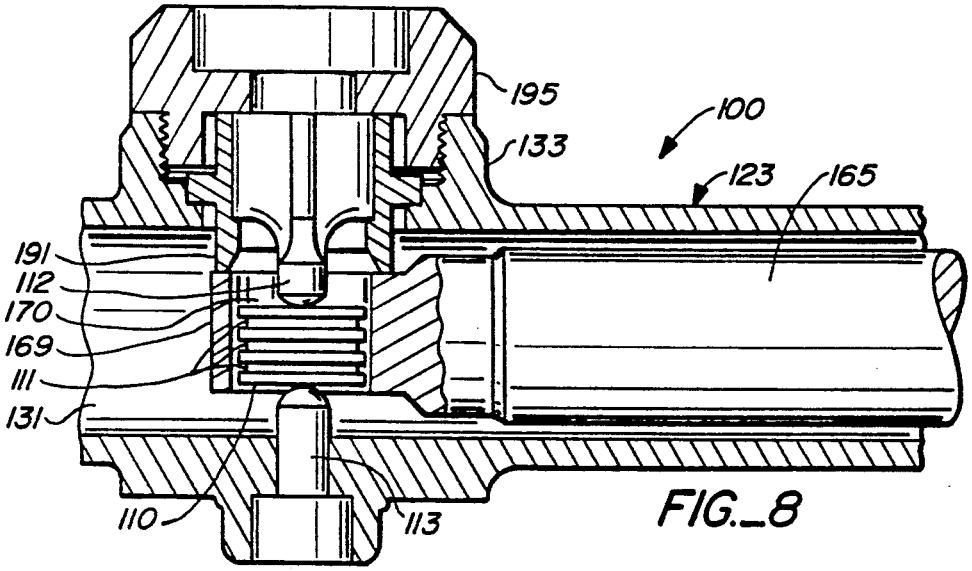
FIG. 8 is an enlarged view of a portion of the flapper valve shown in FIG. 7, showing a section through the flapper tip region and the several parts which comprise the VFFBD.

FIG. 7 is a side elevation sectional view of a version of a solenoid-actuated flapper valve 100 incorporating the preferred embodiment of the valve flapper force balance device (VFFBD) of the present invention. Illustrated elements of flapper valve 100 include body assemble 123 with inlet boss 131 and outlet boss 133, solenoid assembly 127, flapper assembly 125, flapper armature 173, flapper tip 169, bottom stop 113, and spring 180. The outlet portion of flapper valve 100 includes orifice seat 191 and spider 112. The details of the VFFBD are shown in FIG. 8 wherein balance piston 110 is positioned within hole 170 bored in flapper tip 169. Balance piston 110 includes grooves 111; it is axially constrained by spider 112 at the top and stop 113 at the bottom. Flapper assembly 125 (including tip 169) therefore moves substantially independently of balance piston 110. Spider 112 is retained in position by outlet ring 195. The differential pressure between inlet and outlet (acting over the small area of an annulus bounded by seat 191 bottom outside diameter, and the diameter of the hole 170 bored in tip 169) helps to force tip 169 against seat 191, thereby helping to prevent the flow of gas from inlet to outlet. The same pressure differential also acts over the circular area defined by the diameter of balance piston 110 to hold it against the lower end of spider 112.

Referring to FIGS. 7 and 8, with no power applied to the solenoid assembly 127 the flapper tip 169 is spring loaded against seat 191 thereby blocking the outlet. With power applied solenoid assembly 127 only has to develop sufficient force to overcome the spring force and the gas pressure force acting over the small (as compared to the balance piston area) area of the annulus to cause the flapper tip 169 to unseat allowing gas to flow out.

The upward force of the gas on the free piston 110 is reacted by spider 112; without the VFFBD the solenoid would need to draw additional electrical power to overcome this same force. In the preferred embodiment for the VFFBD illustrated the balance piston 110 and the flapper tip 169 are made from TZM and carburized to prevent galling. The clearance between the balance piston 110 and the hole 170 should be minimized to prevent excessive leakage. The balance piston grooves 111 provide additional sharp edges and recesses for decreasing leakage.

Figure 9:
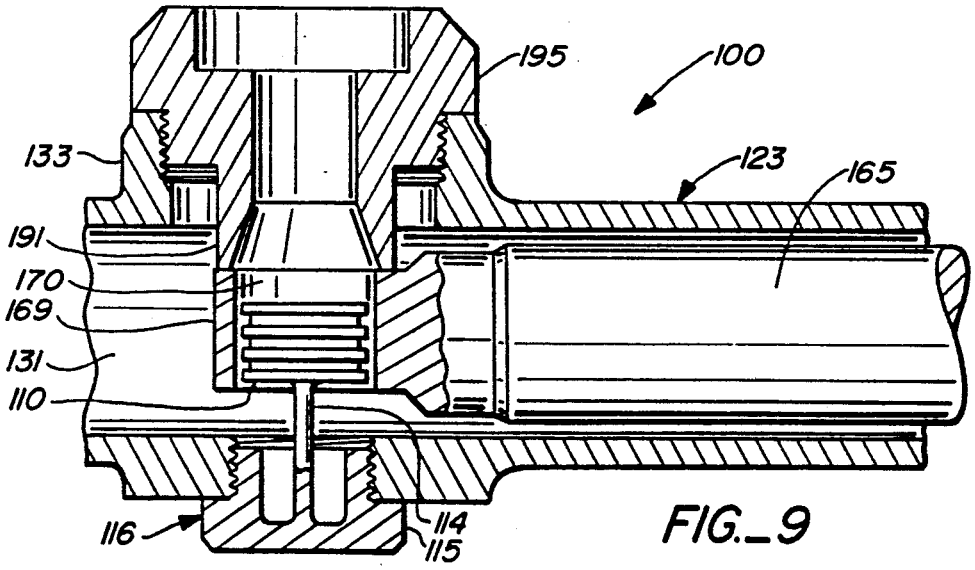
FIG. 9 is an alternative to the embodiment of the VFFBD as shown in FIG. 8.

FIG. 9 is an alternative to the version of the VFFBD shown in FIG. 8. In FIG. 9 the balance piston 110 is axially constrained within the hole 170 in flapper tip 169 by a thin flexure rod 114. As the gas force on balance piston 110 acts to place rod 114 only in tension, it can be made quite thin and flexible; conservatively it should be designed to resist a compression force (without buckling) corresponding to the maximum solenoid force output (in the event that the balance piston should jam due to contamination). The example of this version, as illustrated in FIG. 9, shows the piston 110, flexure rod 114, and the bottom cap 115 as portions of a one-piece flex-piston assembly 116. This alternative version of the VFFBD provides a convenient means for conceptualizing the VFFBD as a device that essentially converts an ordinary flapper valve into a kind of sleeve valve, where the flapper tip 169 can be viewed conceptually as a sleeve having an inside diameter of the hole 170 diameter and an outside diameter corresponding to the bottom outside diameter of seat 191. This conceptual sleeve valve then operates by the sleeve back and forth over the axially constrained piston, the end of the sleeve opening and closing against a plane surface (the bottom of seat 191).

It will be clear to those skilled in the art that the instant invention can be utilized in other apparatus to achieve reductions in required operating forces. This invention has been described in detail with particular reference to a certain preferred embodiment, but it will be understood that variation and modifications can be effected within the spirit and scope of the invention.

That which is claimed is:

1. In combination with an integrated valve assembly having two identical high-thrust major nozzles, two identical low-thrust minor nozzles, two identical poppet valves, and four identical electric-solenoid-operated flapper valves each flapper valve including a flapper valve body and a flapper, each flapper including means for attaching a flapper tip thereto, the improvement to each of the flapper valves thereof which comprises:

a flapper tip disposed to attach to the flapper, said tip having a cylindrical hole extending entirely through said tip and generally oriented parallel to the direction of tip motion;

a generally cylindrical balance piston disposed to fit freely within said hole in said tip; and means for axially constraining movement of said piston located within said tip relative to the flapper valve body.

* * * * *